US012350944B2

(12) United States Patent
Arazaki

(10) Patent No.: US 12,350,944 B2
(45) Date of Patent: Jul. 8, 2025

(54) PRINTING APPARATUS AND PRINTING METHOD

(71) Applicant: SEIKO EPSON CORPORATION, Tokyo (JP)

(72) Inventor: Shinichi Arazaki, Fujimi-Machi (JP)

(73) Assignee: Seiko Epson Corporation, Tokyo (JP)

( * ) Notice: Subject to any disclaimer, the term of this patent is extended or adjusted under 35 U.S.C. 154(b) by 203 days.

(21) Appl. No.: 18/058,696

(22) Filed: Nov. 23, 2022

(65) Prior Publication Data

US 2023/0166525 A1 Jun. 1, 2023

(30) Foreign Application Priority Data

Nov. 26, 2021 (JP) ................................ 2021-191798

(51) Int. Cl.

| | |
|---|---|
| ***B41J 2/21*** | (2006.01) |
| ***B41J 2/045*** | (2006.01) |
| ***B41J 25/00*** | (2006.01) |
| ***B41J 29/393*** | (2006.01) |

(52) U.S. Cl.

CPC ......... *B41J 2/2132* (2013.01); *B41J 2/04558* (2013.01); *B41J 25/006* (2013.01); *B41J 29/393* (2013.01); *B41J 2203/01* (2020.08)

(58) Field of Classification Search

CPC .... B41J 2/0451; B41J 2/04558; B41J 2/2132; B41J 2/2142; B41J 29/393; B41J 2203/01

See application file for complete search history.

(56) References Cited

U.S. PATENT DOCUMENTS

2021/0122155 A1* 4/2021 Takahashi ............ G06K 15/027

FOREIGN PATENT DOCUMENTS

JP 2016-114507 A 6/2016

* cited by examiner

*Primary Examiner* — Sharon Polk

(74) *Attorney, Agent, or Firm* — WORKMAN NYDEGGER

(57) ABSTRACT

A printing apparatus includes a printing head configured to eject ink onto a medium based on print data, a carriage that is mounted with the printing head and that is configured to reciprocate along a main scanning direction, a control unit configured to control the carriage and the printing head and execute a pass corresponding to ink ejection of the printing head along with movement of the carriage, and a colorimetric unit configured to measure density on the medium when the pass is completed.

7 Claims, 8 Drawing Sheets

PRINTING APPARATUS AND PRINTING METHOD

The present application is based on, and claims priority from JP Application Serial Number 2021-191798, filed Nov. 26, 2021, the disclosure of which is hereby incorporated by reference herein in its entirety.

BACKGROUND

1. Technical Field

The present disclosure relates to a printing apparatus and a printing method.

2. Related Art

There is disclosed an image formation apparatus (see JP-A-2016-114507). In the image formation apparatus, a carriage on which a recording head is mounted includes a colorimetric camera. According to JP-A-2016-114507, a test pattern is recorded on a recording medium by transporting the recording medium and moving the carriage. The colorimetric camera moves above the recording medium, and captures an image of each patch of the test pattern. A colorimetric value of the patch is calculated based on the image data.

In a configuration in which a camera captures an image printed on a medium for the purpose of color adjustment and a colorimetric value is acquired as in JP-A-2016-114507, correction based on the colorimetric value is reflected on printing to be performed later. Thus, the captured image is a test image printed merely for color adjustment, and cannot fully be used as a printed matter. The cost increased by consumption of such a medium or the elongation of time required for generating a printed matter need to be reduced, and improvement therefor is demanded.

SUMMARY

A printing apparatus includes a printing head configured to eject ink onto a medium based on print data, a carriage that is mounted with the printing head and that is configured to reciprocate along a main scanning direction, a control unit configured to control the carriage and the printing head and execute a pass corresponding to ink ejection of the printing head along with movement of the carriage, and a colorimetric unit configured to measure density on the medium when the pass is completed. When the control unit performs printing in a predetermined region of the medium with the pass executed N times, and n is a natural number smaller than N, the control unit acquires n-th density of the medium, the n-th density being a colorimetric result obtained by the colorimetric unit when an n-th pass in the predetermined region is completed, corrects the print data based on the n-th density, the print data being to be used for a pass after the n-th pass in the predetermined region, and executes the pass after the n-th pass based on the print data after correction.

A printing method, for controlling a printing head configured to eject ink onto a medium based on print data and a carriage that is mounted with the printing head and that is configured to reciprocate along a main scanning direction, and for executing a pass corresponding to ink ejection of the printing head along with movement of the carriage, includes, when printing is performed in a predetermined region of the medium with the pass executed N times, and n is a natural number smaller than N, acquiring n-th density of the medium, the n-th density being a density colorimetric result obtained by a colorimetric unit when an n-th pass in the predetermined region is completed, correcting the print data based on the n-th density, the print data being to be used for a pass after the n-th pass in the predetermined region, and executing the pass after the n-th pass based on the print data after correction.

DESCRIPTION OF EXEMPLARY EMBODIMENTS

Exemplary embodiments of the present disclosure are described below with reference to the accompanying drawings. Note that each of the drawings is merely illustrative for describing the exemplary embodiment. Since the drawings are illustrative, proportions and shapes may not be precise, match each other, or some may be omitted.

1. Outline Description on Apparatus Configuration

Figure 1:
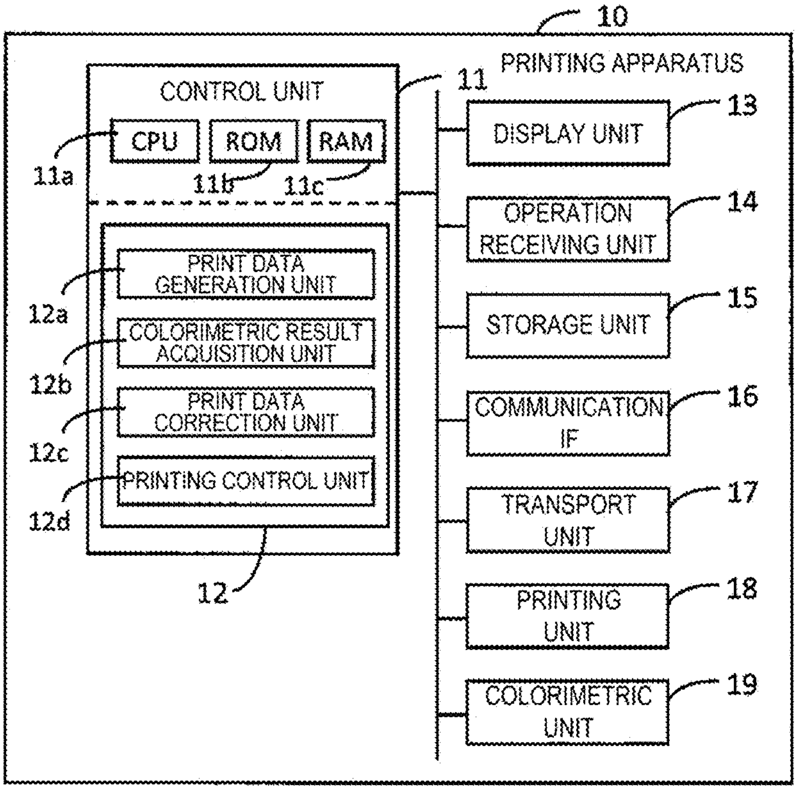
FIG. 1 is a block diagram illustrating an apparatus configuration according to the present exemplary embodiment, in a simplified manner.

FIG. 1 illustrates a configuration of a printing apparatus 10 according to the present exemplary embodiment, in a simplified manner. A printing method according to the present exemplary embodiment is performed by the printing apparatus 10.

The printing apparatus 10 is provided with a control unit 11, a display unit 13, an operation receiving unit 14, a storage unit 15, a communication IF 16, a transport unit 17, a printing unit 18, a colorimetric unit 19, and the like. IF is an abbreviation for interface. The control unit 11 is configured to include one or more ICs including a CPU 11*a* as a processor, a ROM 11*b*, a RAM 11*c*, and the like, another non-volatile memory, and the like.

In the control unit 11, the processor, that is, the CPU 11*a* executes arithmetic processing in accordance with a program 12 stored in the ROM 11*b*, the other memory, or the like, while using the RAM 11*c* or the like as a work area. With this, the respective functions including a print data generation unit 12*a*, a colorimetric result acquisition unit 12*b*, a print data correction unit 12*c*, and a printing control unit 12*d* are achieved. The processor is not limited to the single CPU, and a configuration may be adopted in which the processing is performed by a hardware circuit such as a plurality of CPUs, an ASIC, or the like, or a configuration may be adopted in which the CPU and the hardware circuit work in concert to perform the processing.

The display unit 13 is a device for displaying visual information, and is configured, for example, by a liquid crystal display, an organic EL display, or the like. The display unit 13 may be configured to include a display and a drive circuit for driving the display. The operation receiving unit 14 is a device for receiving an input from a user, and is realized, for example, by a physical button, a touch panel, a mouse, a keyboard, or the like. As a matter of course, the touch panel may be realized as a function of the display unit 13. The display unit 13 and the operation receiving unit 14 may also be referred to as an operation panel of the printing apparatus 10, in a collective manner. The display unit 13 and the operation receiving unit 14 may be part of the configuration of the printing apparatus 10, or may be peripheral devices externally coupled to the printing apparatus 10.

The storage unit 15 is a storage device such as a hard disk drive, a solid state drive, and other memories. Part of the memory of the control unit 11 may be regarded as the storage unit 15. The storage unit 15 may be regarded as part of the control unit 11.

The communication IF 16 is a generic term for one or a plurality of IFs for establishing communication between the printing apparatus 10 and an external device in a wired or wireless manner, in accordance with a prescribed communication protocol including a known communication standard. Examples of the external device include a communication device such as a personal computer, a server, a smartphone, and a tablet-type terminal.

The transport unit 17 is a device for transporting a medium 30 along a predetermined transport direction under control of the control unit 11. For example, the transport unit 17 includes a roller that rotates and transports the medium 30, a motor as a power source of the rotation, and the like. The transport unit 17 may be a mechanism that transports the medium 30 while placing the medium 30 on a belt or a pallet that is moved by a motor. The medium 30 is a sheet, for example. The medium 30 is only required to be a medium on which printing can be performed, and may be a material other than paper, such as a film and fabric.

The printing unit 18 is a device of an ink-jet type for ejecting a liquid such as ink from a plurality of nozzles under control of the control unit 11 and for performing printing on the medium 30 transported by the transport unit 17, and includes a printing head 20 and a carriage 21 that are described later. A liquid droplet ejected from each nozzle of the printing head 20 is referred to as a dot. The printing head 20 is capable of ejecting various ink, such as cyan (C), magenta (M), yellow (Y), and black (K). As a matter of course, the liquid ejected from the printing head 20 is not limited to C, M, Y, and K ink. The printing head 20 may also be referred to as a liquid ejection head, a recording head, a printing head, an ink-jet head, or the like.

The colorimetric unit 19 is a device for optically measuring a color and brightness of the medium 30 on which the printing unit 18 performs printing. A color and brightness can be expressed in various color systems. In the following description, a color and brightness measured from the medium 30 after printing are merely referred to as density. High density indicates darkness, and low density indicates brightness. Specifically, the colorimetric unit 19 is a colorimeter, a camera, a scanner, or the like. Colorimetry may be regarded as measurement or reading. The colorimetric unit 19 transfers a colorimetric result to the control unit 11.

The printing apparatus 10 may be realized by one printer, but may be realized by a system including a plurality of devices that are communicatively coupled to each other. For example, the printing apparatus 10 may be a system including an information processing device that functions as the control unit 11, a printer that includes the transport unit 17 and the printing unit 18 and performs printing under control of the information processing device, and a device that corresponds to the colorimetric unit 19. In this case, the information processing device can be understood as a printing control device, an image processing device, or the like.

Figure 2:
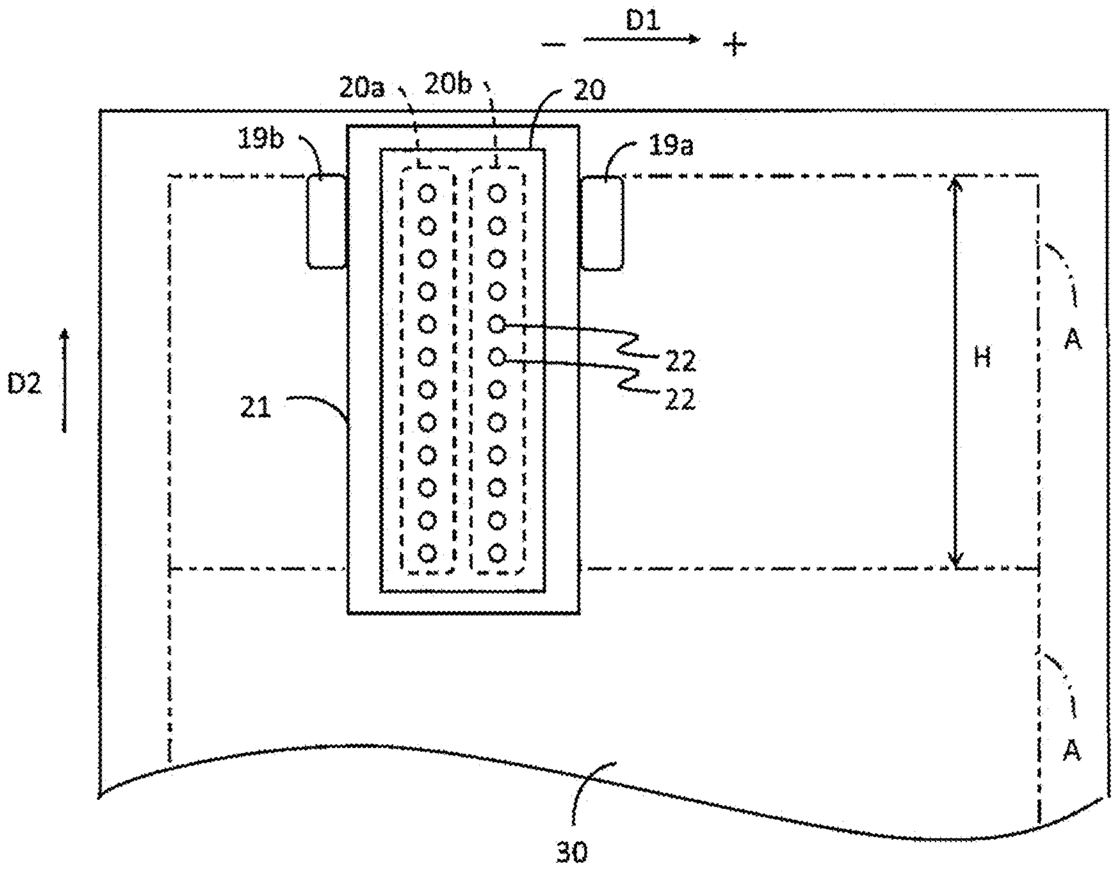
FIG. 2 is a diagram illustrating a relationship between a medium, a printing head, and the like as seen from above, in a simplified manner.

FIG. 2 is a diagram illustrating a relationship between the medium 30 and the printing head 20 and the like as seen from above, in a simplified manner. As illustrated in FIG. 2, the printing head 20 is mounted on the carriage 21. The carriage 21 is capable of reciprocating along a predetermined main scanning direction D1 as a result of receiving power from a carriage motor, which is not illustrated, under control of the control unit 11. For example, a positive direction in the main scanning direction D1 indicates a direction in which the carriage 21 moves forward, and a negative direction in the main scanning direction D1 indicates a direction in which the carriage 21 moves backward. Therefore, the printing head 20 moves forward and backward along the main scanning direction D1 together with the carriage 21.

The printing head 20 includes nozzle rows corresponding to the respective ink colors. FIG. 2 simply describes two nozzle rows 20*a* and 20*b*. Each of white circles illustrated in FIG. 2 indicates an individual nozzle 22. The nozzle row corresponding to one ink color includes the plurality of nozzles 22. A nozzle pitch being an interval between the nozzles 22 in a direction intersecting the main scanning direction D1 is constant or substantially constant. For example, the nozzle row 20*a* is a nozzle row including a plurality of nozzles 22 that eject K ink, and the nozzle row 20*b* is a nozzle row including a plurality of nozzles 22 that eject C ink. Although omitted in illustration, as a matter of course, the printing head 20 includes nozzle rows corresponding to ink of the respective colors such as M ink and Y ink as well as K ink and C ink.

The control unit 11 causes the printing head 20 to eject ink onto the medium 30, based on print data. As is known, a driving element is provided for each of the nozzles 22 in the printing head 20. When application of a driving signal to the driving element of each of the nozzles 22 is controlled based on the print data, each of the nozzles 22 ejects a dot or does not eject a dot. With this, an image represented in the print data is printed on the medium 30. The print data is data that defines presence or absence of a dot of each color and a dot size for each pixel. In the following description, presence of dot, in other words, ejection of a dot is also referred to as "dot-on", and absence of a dot, in other words, non-ejection of a dot is also referred to as "dot-off".

The different amplitude, shape, or the like of the driving signal to be applied to the driving element of the nozzle 22 can make a size of a dot ejected from the nozzle 22 different. For example, the nozzle 22 is capable of ejecting dots of three sizes including a large dot, a middle dot, and a small dot. A relationship between the sizes of one dot satisfies a small dot<a middle dot<a large dot. Therefore, dot-on data for each pixel that is defined in the print data is categorized into any one of large dot-on, middle dot-on, and small dot-on. Note that the nozzle 22 may be capable of ejecting a dot having two sizes or a dot having four or more sizes.

Ink ejection performed by the printing head 20 along with movement of the carriage 21 is referred to as "pass" or "scanning". A pass along with forward movement of the carriage 21 is referred to as a forward pass, and a pass with backward movement of the carriage 21 is referred to as a backward pass. Printing performed in both the forward pass and the backward pass is bidirectional printing, and printing performed in either of the forward pass or the backward pass is single-directional printing. In the present exemplary embodiment, either of bidirectional printing or single-directional printing may be adopted.

A reference symbol D2 indicates a transport direction D2 in which the transport unit 17 transports the medium 30. The transport unit 17 transports the medium 30 from upstream to downstream in the transport direction D2. Upstream and downstream in the transport direction D2 are simply referred to as upstream and downstream. The transport direction D2 intersects the main scanning direction D1. The main scanning direction D1 and the transport direction D2 intersect each other orthogonally or substantially orthogonally. The plurality of nozzle rows including the nozzle rows 20*a* and 20*b* of the printing head 20 are aligned along the main scanning direction D1, and are at the same position in the transport direction D2.

In the example of FIG. 2, colorimeters 19*a* and 19*b* being the colorimetric units 19 are respectively provided at both ends of the printing head 20 in the main scanning direction D1. Specifically, the colorimeter 19*a* is mounted at an end of the carriage 21 on a positive side in the main scanning direction D1, and the colorimeter 19*b* is mounted at an end of the carriage 21 on a negative side in the main scanning direction D1. The colorimeters 19*a* and 19*b* and the printing head 20 reciprocate together with the carriage 21. With this configuration, density of ink ejected from the printing head 20 onto the medium 30 in the forward pass can be measured by the colorimeter 19*b* during the same forward movement. Similarly, density of ink ejected from the printing head 20 onto the medium 30 in the backward pass can be measured by the colorimeter 19*a* during the same backward movement. Each of the colorimeter 19*a* and the colorimeter 19*b* is a specific example of the colorimetric unit 19 capable of measuring density on the medium 30 at the time of completion of a pass. Completion of a pass is not limited to a state in which movement in one forward pass or one backward pass is completed. For example, even in the middle of the forward pass, the pass is completed in a range of the medium 30 where ink ejection is already finished in the forward pass.

2. Printing in Predetermined Region with Pass Division

In FIG. 2, one region A surrounded by a two-dot chain line in the medium 30 is an example of a "predetermined region" where printing is performed with N passes. N is a natural number equal to or greater than 2. For example, it is assumed that N=4. In this case, printing in the predetermined region A is completed with four passes in total. When bidirectional printing is adopted, printing in one predetermined region A is completed by reciprocating the carriage 21 twice. When single-directional printing is adopted, printing in one predetermined region A is completed by reciprocating the carriage 21 four times.

A length of the predetermined region A in the transport direction D2 is denoted with a region length H. A length of the predetermined region A in the main scanning direction D1 may be understood as a length of the medium 30 in the main scanning direction D1. As a matter of course, when margins are set in advance at edges of the medium 30, a length excluding such margins at the edges corresponds to the length of the predetermined region A in the main scanning direction D1.

In the example of FIG. 2, the region length H is substantially equal to a length of the nozzle row in the transport direction D2. In other words, under a state in which the transport unit 17 stops the medium 30, the control unit 11 controls the carriage 21 and the printing head 20 and executes the N passes. With this, printing in one predetermined region A is completed. After printing in one predetermined region A is completed, the control unit 11 may cause the transport unit 17 to transport the medium 30 by the region length H and stop the transport, and may start printing in a subsequent predetermined region A adjacent upstream of the predetermined region A in which printing is previously completed. In view of this, the predetermined region A can be understood as a region having a predetermined size that is set in advance based on a size of the medium 30 or the nozzle row or the like.

In the example of FIG. 2, each of the colorimeters 19*a* and 19*b* has a size that only allows measurement of a range corresponding to part of the length of the nozzle row in the transport direction D2. Note that, the colorimeters 19*a* and 19*b* may have a size that allows measurement of a range corresponding to the entire length of the nozzle row. The control unit 11 may cause the transport unit 17 to transport the medium 30 for each pass. For example, it is assumed that the region length H is set to 1/N of the length of the nozzle row in the transport direction D2. Further, the control unit 11 causes the transport unit 17 to transport the medium 30 by the region length H during an interval between execution of one pass and start of a subsequent pass. The above-mentioned process is repeated N times, and thus printing in one predetermined region A with the N passes can be completed.

Figure 3:
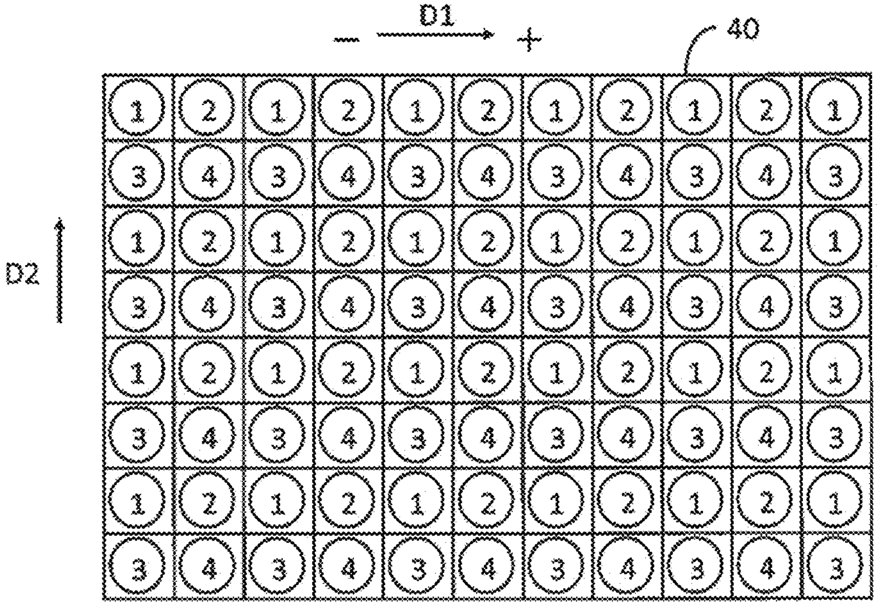
FIG. 3 is a diagram illustrating an example of print data for performing printing in a predetermined region.

FIG. 3 illustrates print data 40 corresponding to one predetermined region A, in a simplified manner. FIG. 3 also illustrates a correspondence relationship between the orientation of the print data 40 and the directions D1 and D2. Each of rectangular shapes forming the print data 40 indicates each pixel. A white circle illustrated in each pixel indicates an ink dot of a certain color, and the numbers 1 to 4 in the white circles indicate a pass number for performing printing in one predetermined region A. In other words, in FIG. 3, it is assumed that N=4. As described above, the dot-on data defined for a pixel indicates any one of a large dot, a middle dot, and a small dot, but in FIG. 3, the difference of the dot sizes is not expressed. All the pixels are not always dot-on in actual print data. However, illustration shows a position of a pixel and a pass with which printing is performed, while assuming that all the pixels are dot-on in the print data 40.

In accordance with a first pass for performing printing in a predetermined region A, the control unit 11 provides the printing head 20 with print data containing pixel data indicating positions numbered with a pass number 1 in the print data 40. Then, the first pass is executed. Similarly, the control unit 11 provides the printing head 20 with print data containing pixel data indicating positions numbered with a pass number 2 in the print data 40, and executes a second pass. The control unit 11 provides the printing head 20 with print data containing pixel data indicating positions numbered with a pass number 3 in the print data 40, and executes a third pass. The control unit 11 provides the printing head 20 with print data containing pixel data indicating positions numbered with a pass number 4 in the print data 40, and executes a fourth pass. As a result, an image represented in the print data 40 is printed in the predetermined region A of the medium 30 with the four passes in total.

3. Printing Control Process with Measurement and Correction

As described above, in a case that printing is performed in the predetermined region A of the medium 30 with the N passes and that n is a natural number smaller than N, the control unit 11 acquires n-th density being a colorimetric result obtained by the colorimetric unit 19 with respect to the medium 30 when an n-th pass in the predetermined region A is completed. Further, print data to be used for a pass after the n-th pass in the predetermined region A is corrected based on the n-th density, and the pass after the n-th pass is executed based on the print data after correction. Some examples are given below, and description is made on printing with such correction executed in a process for completing the N passes.

For convenience of description, it is assumed that N=4 in any one of the first example, the second example, and the third example.

First Example

Figure 4:
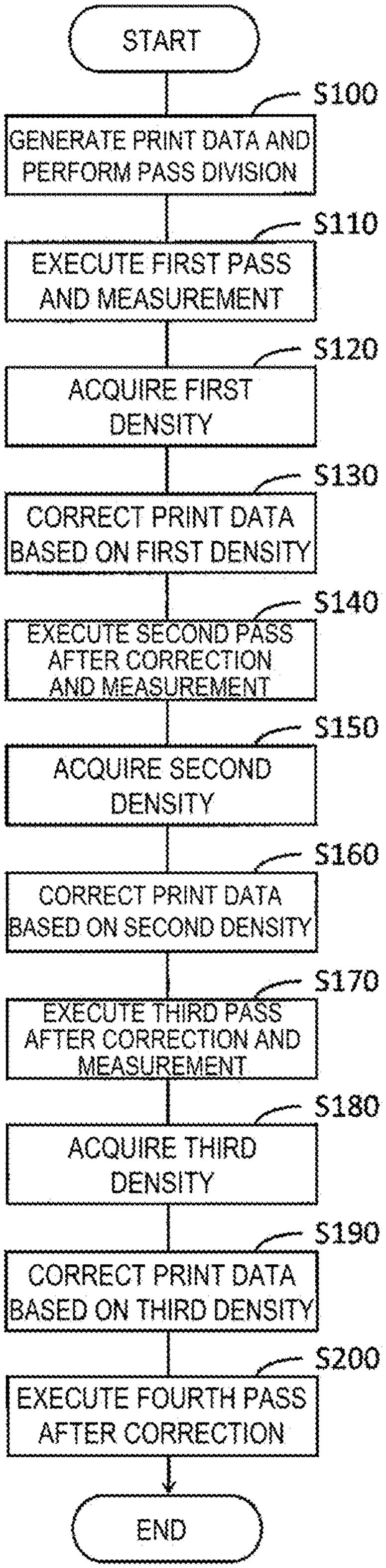
FIG. 4 is a flowchart illustrating a printing control process in a first example.

FIG. 4 illustrates, using a flowchart, a printing control process in the first example, which is executed by the control unit 11 in accordance with the program 12. Each flowchart shows the printing method according to the present exemplary embodiment.

In Step S100, the print data generation unit 12*a* of the control unit 11 executes generation of the print data and pass division of the print data. First, the print data generation unit 12*a* acquires image data being a generation source of the print data. The image data represents an image being a printing target. For example, the print data generation unit 12*a* acquires image data assigned by a user through an operation of the operation receiving unit 14, from a location where the image data is stored, such as the storage unit 15 or a memory inside or outside the printing apparatus 10. Alternatively, the print data generation unit 12*a* receives and acquires image data transmitted from an external device via the communication IF 16.

The print data generation unit 12*a* converts the acquired image data into print data used for ink ejection of the printing head 20. In other words, the print data generation unit 12*a* chromatically converts a value for each of the pixels forming the image data into a gradation value indicating an ink amount for C, M, Y, and K ink used by the printing head 20 for printing, or converts a value for each of the pixels after chromatic conversion into a value indicating dot-on or dot-off of each color ink through halftone processing. Dot-on referred herein may be large dot-on, middle dot-on, or small dot-on, as a matter of course.

The print data generation unit 12*a* divides the print data thus generated, that is, the print data for a region corresponding to one predetermined region A, into print data to be used for each of the first pass to the fourth pass. As illustrated in FIG. 3, pass division of the print data is a process for associating the respective pixels, which form the print data corresponding to one predetermined region A, with the pass numbers 1 to 4 in accordance with positions of the pixels.

It is assumed that an image for one page is printed on one medium 30 based on the print data. In this case, printing for one page is completed as a result of successive printing for a plurality of predetermined regions A along the transport direction D2. Therefore, in each of the flowcharts in FIG. 4, and FIG. 6 and FIG. 7 that are described later, description is made mainly on printing in one predetermined region A. The same process described herein is repeated, and thus printing for one page is completed.

In Step S110, the printing control unit 12*d* provides the printing head 20 with the print data to be used for the first pass, which is acquired through the pass division in Step S100 from the print data corresponding to the predetermined region A, and executes the first pass. Along with the first pass, the control unit 11 causes the colorimetric unit 19 to measure density on the medium 30 after the ink ejection in the first pass. If the first pass is the forward pass, the control unit 11 causes the colorimeter 19*b* to perform the measurement.

In Step S120, the colorimetric result acquisition unit 12*b* acquires, from the colorimetric unit 19, first density being a colorimetric result in Step S110. In Step S110 and Step S120 described above, n=1.

In Step S130, based on the first density acquired in Step S120, the print data correction unit 12*c* corrects the print data to be used for the second pass, which is acquired through the pass division in Step S100 from the print data corresponding to the predetermined region A.

Focusing on, as an example, a case in which the print data to be used for the second pass is corrected based on the first density, description is specifically made on a method of correcting the print data based on the density measured by the colorimetric unit 19. As a matter of course, the correction method is applicable to a combination of density and print data other than the combination of the first density and the print data to be used for the second pass.

The first density is a result of measurement performed in the pass in Step S110 by the colorimeter positioned rearward of the printing head 20 in the movement direction. Thus, the first density is density in a certain area onto which the ink is ejected in the first pass. In view of this, the print data correction unit 12*c* calculates an average value of the first density, for example, as a statistic value indicating the first density in a simplified manner. In the following description, such a statistic value of the n-th density is simply referred to as the n-th density. The statistic value may be other values such as a median value.

The print data correction unit 12*c* compares the first density and a first reference value. The first reference value is a value to be compared with the first density. The first reference value is an ideal value as density on the medium 30 at the time of completion of the first pass. For example, an n-th reference value being an ideal value as density at the time of completion of the n-th pass can be obtained from the print data generated in Step S100 with a predetermined calculation formula. Alternatively, the n-th reference value may be added to the image data being a generation source of the print data in advance, or may be stored together with the image data in the storage unit 15 or the like.

Based on the comparison result between the first density and the first reference value, the print data correction unit 12*c* determines a correction amount for the print data to be used for the second pass. It is ideal that the first density matches with the first reference value. However, in actuality, a degree of color development differs due to the easiness of ink bleed-through or other characteristics of the medium 30 being used. Thus, the first density does not match with the first reference value in many cases. When the first density is higher than the first reference value, this means that the ink ejection amount in the first pass is excessively large. Thus, a negative correction amount is determined based on the difference between the first density and the first reference value. Meanwhile, when the first density is lower than the first reference value, this means that the ink ejection amount in the first pass is excessively small. Thus, a positive correction amount is determined based on the difference between the first density and the first reference value.

Based on the correction amount determined as a result of the comparison between the first density and the first reference value, the print data correction unit 12*c* corrects the print data to be used for the second pass. A difference between the ink amounts of the dots of different sizes is known in the design phase. Thus, based on the correction amount, a size of some of the dots defined in the print data to be used for the second pass is increased or reduced. For example, when the correction amount is a value $-\alpha$, the print data correction unit 12*c* determines the number of middle dots to be changed to small dots and the number of large dots to be changed to middle dots so as to achieve reduction of an ink amount corresponding to $-\alpha$, and changes the dot sizes accordingly. For example, when the correction amount is a value of $+\beta$, the print data correction unit 12*c* determines the number of middle dots to be changed to large dots and the number of small dots to be changed to middle dots so as to achieve increase of an ink amount corresponding to $+\beta$, and changes the dot sizes accordingly. Note that, although a large dot may be changed to a small dot and a small dot may be changed to a large dot, the print data is originally generated in consideration of image quality such as graininess, and drastic change of a dot size largely affects the image quality. Thus, a correction amount required for an entire image may be secured while reducing a change amount of a dot size for each pixel as much as possible. The print data correction unit 12*c* determines such a correction amount for each of the C ink, the M ink, the Y ink, and the K ink. For example, a dot size of the K ink is changed based on the correction amount of the K ink. The same holds true for the ink of the other colors.

Figure 5:
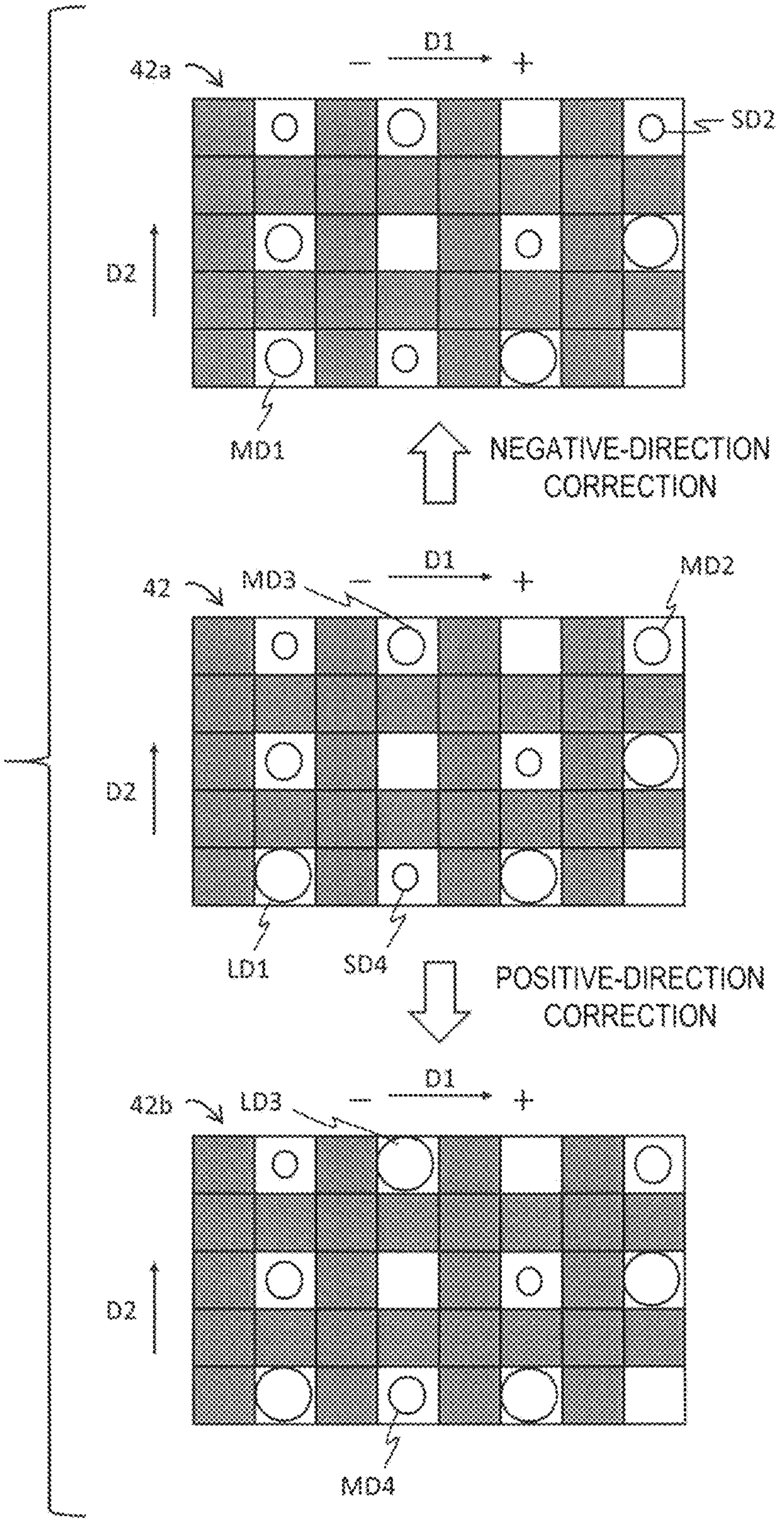
FIG. 5 is a diagram for describing a specific example of a method of correcting print data.

FIG. 5 is a diagram for describing a specific example of the correction in Step S130. The middle stage of FIG. 5 illustrates part of print data 42 used for the second pass. The print data 42 relates to a certain ink color, for example, K. Similarly to the print data 40 in FIG. 3, each rectangular shape indicates each pixel in FIG. 5. Each gray pixel among the pixels is a pixel allocated to any one of the first pass, the third pass, and the fourth pass, and white pixels form the print data 42 to be used for the second pass. As a matter of course, the gray color and the white color in the drawing is merely an expression for convenience of the description, and are irrelevant to an actual pixel color. Among the pixels forming the print data 42, a pixel with a white circle is a pixel defined as dot-on of the K ink, and a pixel without a white circle is a pixel defined as dot-off of the K ink. Different sizes of the white circles indicate a large dot, a middle dot, and a small dot. As a matter of course, the gray pixel allocated to any one of the first pass, the third pass, and the fourth pass is also defined as dot-on or dot-off of the K ink, which is omitted in illustration.

The upper stage of FIG. 5 illustrates print data 42*a* as a result of negative-direction correction being correction for reducing the ink amount with respect to the print data 42 in Step S130. Meanwhile, the lower stage of FIG. 5 illustrates print data 42*b* as a result of positive-direction correction being correction for increasing the ink amount with respect to the print data 42 in Step S130. Specifically, during the negative-direction correction from the print data 42 to the print data 42*a*, a large dot LD1 and a middle dot MD2 being some of the dots defined in the print data 42 are changed to a middle dot MD1 and a small dot SD2 in the print data 42*a*, respectively. Meanwhile, during the positive-direction correction from the print data 42 to the print data 42*b*, a middle dot MD3 and a small dot SD4 being some of the dots defined in the print data 42 are changed to a large dot LD3 and a middle dot MD4 in the print data 42*b*, respectively.

In the example of FIG. 5 described above, in the correction of the print data, the print data correction unit 12*c* changes sizes of the dots defined in the print data before correction. Specifically, sizes of the dots defined in the print data generated in Step S100 are increased or reduced. In other words, a new dot is not provided to a pixel defined as dot-off in the print data generated in Step S100. The print data correction unit 12*c* randomly selects a dot subjected to a size change during the correction by using, for example, random numbers or the like. With this, positions of the dots to be changed in size are dispersed as evenly as possible in the image.

In Step S140, the printing control unit 12*d* provides the printing head 20 with the print data obtained after the print data to be used for the second pass is corrected in Step S130, and executes the second pass. Along with the second pass, the control unit 11 causes the colorimetric unit 19 to measure density on the medium 30 after the ink ejection in the second pass. If the second pass is the backward pass, the control unit 11 causes the colorimeter 19*a* to perform measurement.

After this, a cycle including acquisition of the n-th density as a colorimetric result, correction of the print data to be used for the (n+1)-th pass based on the acquired n-th density, and execution of the (n+1)-th pass with the correction reflected and measurement is repeated.

In other words, in Step S150, the colorimetric result acquisition unit 12*b* acquires, from the colorimetric unit 19, second density being a colorimetric result in Step S140. As a matter of course, the second density is a colorimetric result on a state where the ink ejection in the second pass is added to the ink ejection in the first pass. In Step S140 and Step S150, n=2. In Step S160, based on the second density acquired in Step S150, the print data correction unit 12*c* corrects the print data to be used for the third pass, which is acquired through the pass division in Step S100 from the print data corresponding to the predetermined region A. In Step S170, the printing control unit 12*d* provides the printing head 20 with the print data obtained after the print data to be used for the third pass is corrected in Step S160, and executes the third pass. Along with the third pass, the control unit 11 causes the colorimetric unit 19 to measure density on the medium 30 after the ink ejection in the third pass.

In Step S180, the colorimetric result acquisition unit 12*b* acquires, from the colorimetric unit 19, third density being a colorimetric result in Step S170. The third density is a colorimetric result on a state where the ink ejection in the second pass and the ink ejection in the third pass are added to the ink ejection in the first pass. In Step S190, based on the third density acquired in Step S180, the print data correction unit 12*c* corrects the print data to be used for the fourth pass, which is acquired through the pass division in Step S100 from the print data corresponding to the predetermined region A. In Step S200, the printing control unit 12*d* provides the printing head 20 with the print data obtained after the print data to be used for the fourth pass is corrected in Step S190, and executes the fourth pass. The fourth pass is the last pass in the predetermined region A, and hence there is no need for the colorimetric unit 19 to perform measurement. With this, printing in one predetermined region A with the N passes is completed.

As described above, in the first example, the control unit 11 corrects the print data to be used for the (n+1)-th pass in the predetermined region A based on the n-th density, and executes the (n+1)-th pass based on the print data after the correction. In other words, in each of the second and subsequent passes, the ink is ejected based on the corrected print data. Thus, it is expected that a difference between the second density and a second reference value being the n-th reference value to be compared with the second density and a difference between the third density and a third reference value being the n-th reference value to be compared with the third density are smaller than a difference between the first density and the first reference value, and are reduced in a stepwise manner due to an effect of repeating the correction. Therefore, regardless of a type of the medium 30, a printing result in the predetermined region A at the time of completion of the N-th pass with the last correction reflected corresponds to density fairly close to the ideal density to be reproduced by the print data corresponding to the predetermined region A. In other words, a printed matter on which an image represented in the print data is reproduced at high chromatic accuracy can be obtained without wasting the medium 30 by so-called test printing.

Second Example

In the first example, in order for a density colorimetric result acquired at the time of completion of a pass to be reflected on a subsequent pass, a time for determining a correction amount based on the density and correcting the print data is required between the pass and the subsequent pass. As compared with the first example described above, each of the second example and the third example is an example for reducing a total printing time with the N passes. Description on the matters shared with the first example is omitted as appropriate in the second example and the third example.

Figure 6:
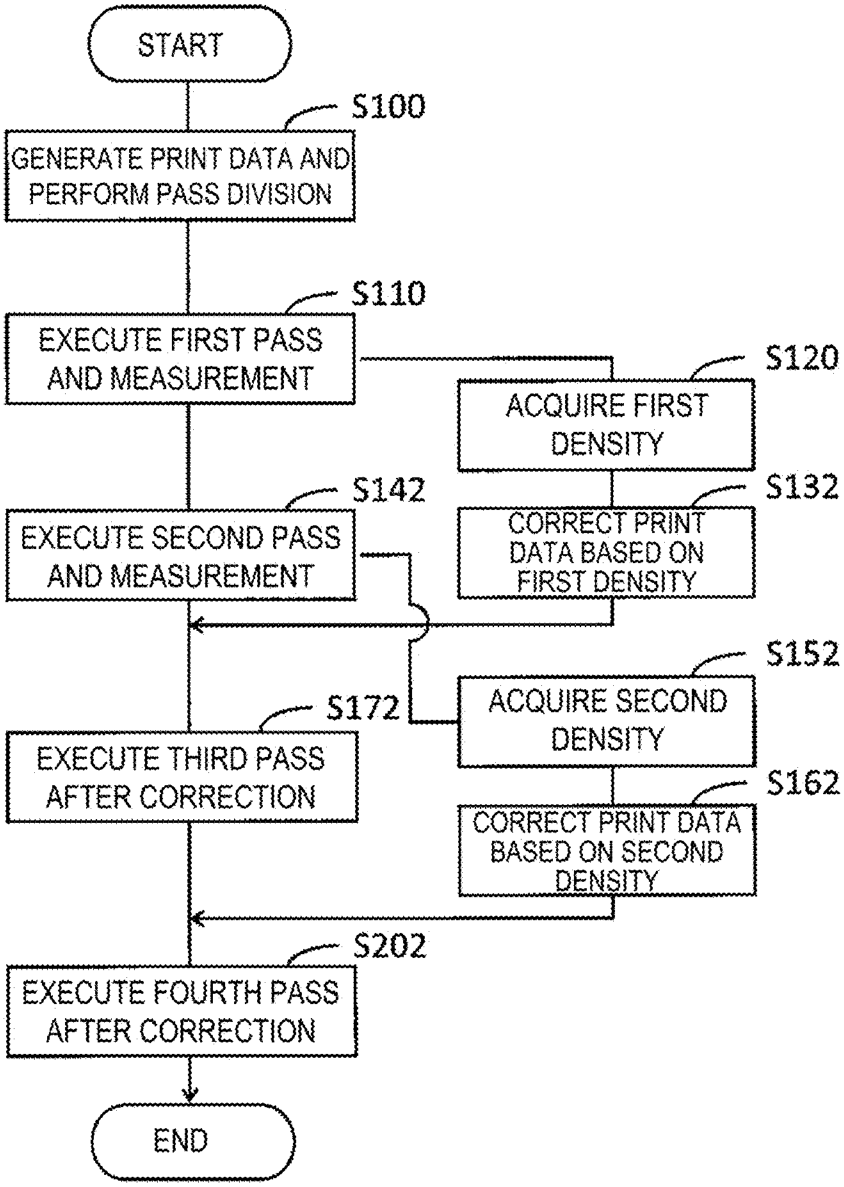
FIG. 6 is a flowchart illustrating a printing control process in a second example.

FIG. 6 illustrates, using a flowchart, a printing control process in the second example, which is executed by the control unit 11 in accordance with the program 12. In the second example, the control unit 11 corrects the print data to be used for the (n+2)-th pass in the predetermined region A based on the n-th density, and executes the (n+2)-th pass based on the print data after the correction.

Step S100, Step S110, and Step S120 are as described with reference to FIG. 4. In the second example, after Step S110, the control unit 11 executes Step S142, Step S120, and Step S132 in parallel.

In Step S142, the printing control unit 12*d* provides the printing head 20 with the print data to be used for the second pass, which is acquired through the pass division in Step S100 from the print data corresponding to the predetermined region A, and executes the second pass. Along with the second pass, the control unit 11 causes the colorimetric unit 19 to measure density on the medium 30 after the ink ejection in the second pass. In Step S140 described in FIG. 4, the print data to be used for the second pass is corrected based on the first density, and the second pass is executed based on the print data after the correction. In contrast, in Step S142, the print data to be used for the second pass is directly used to execute the second pass without correction.

In Step S132 subsequent to Step S120, based on the first density acquired in Step S120, the print data correction unit 12*c* corrects the print data to be used for the third pass, which is acquired through the pass division in Step S100 from the print data corresponding to the predetermined region A. In other words, Step S132 is different from Step S130 in that the correction target is not the print data to be used for the second pass, which is acquired through the pass division in Step S100, but the print data to be used for the third pass, which is acquired through the pass division in Step S100.

After Step S132 and Step S142 are completed, the control unit 11 executes Step S172, Step S152, and Step S162 in parallel.

In Step S172, the printing control unit 12*d* provides the printing head 20 with the print data obtained after the print data to be used for the third pass is corrected in Step S132, and executes the third pass. The third pass is not the last pass in the predetermined region A. However, when n=3, the (n+2)-th pass in the predetermined region A is not present. Thus, there is no need for the colorimetric unit 19 to perform measurement.

Meanwhile, in Step S152, the colorimetric result acquisition unit 12*b* acquires, from the colorimetric unit 19, the second density being a colorimetric result in Step S142. In Step S162 subsequent to Step S152, based on the second density acquired in Step S152, the print data correction unit 12*c* corrects the print data to be used for the fourth pass, which is acquired through the pass division in Step S100 from the print data corresponding to the predetermined region A. Step S162 is different from Step S160 in that the correction target is not the print data to be used for the third pass, which is acquired through the pass division in Step S100, but the print data to be used for the fourth pass, which is acquired through the pass division in Step S100.

After Step S162 and Step S172 are completed, in Step S202, the printing control unit 12*d* provides the printing head 20 with the print data obtained after the print data to be used for the fourth pass is corrected in Step S162, and executes the fourth pass. With this, printing in one predetermined region A with the N passes is completed.

As described above, in the second example, the control unit 11 corrects the print data to be used for the (n+2)-th pass in the predetermined region A, based on the n-th density. Thus, after the n-th pass is executed, a series of processing for correcting the print data to be used for the (n+2)-th pass can be executed in parallel to the (n+1)-th pass. Thus, a time required for completing the N passes can be shorter than that in the first example.

Third Example

Figure 7:
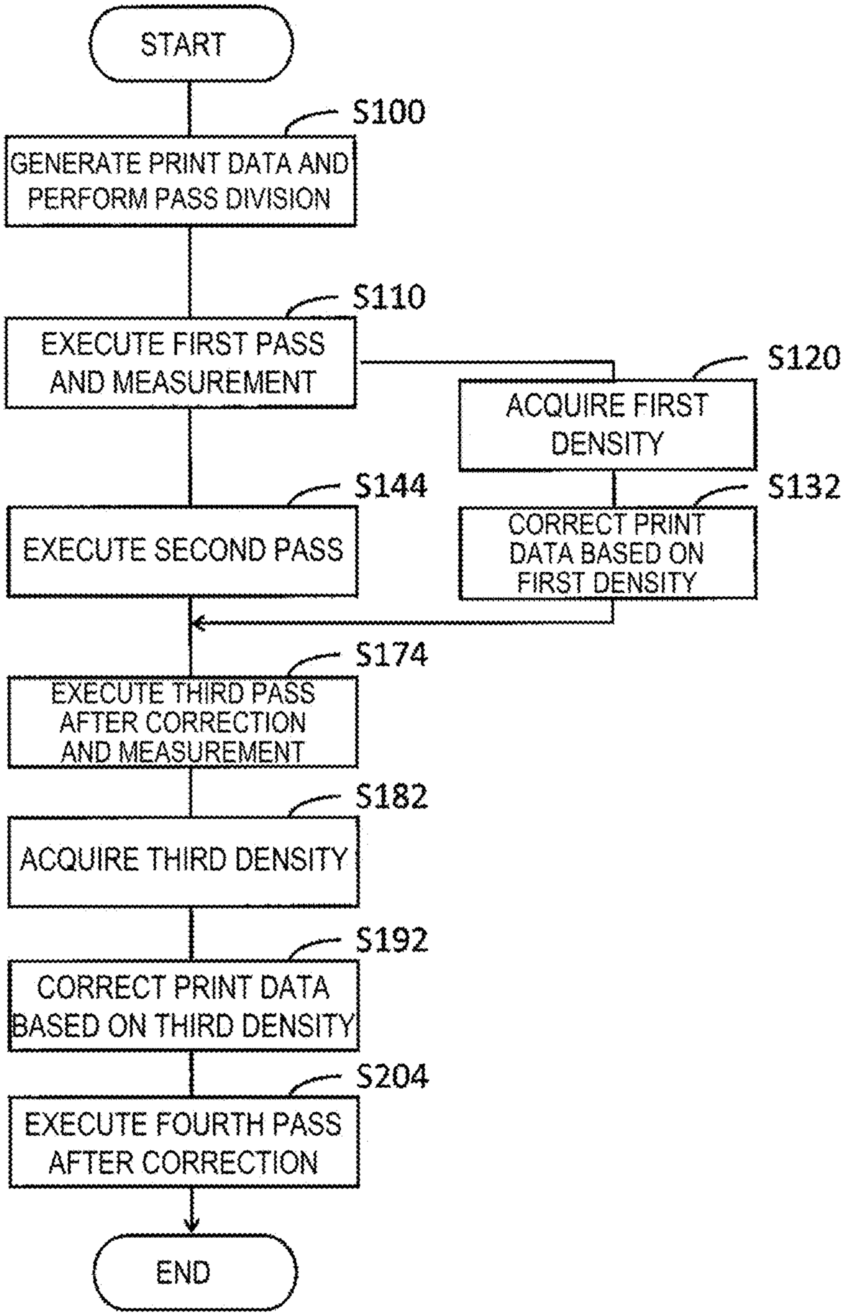
FIG. 7 is a flowchart illustrating a printing control process in a third example.

FIG. 7 illustrates, using a flowchart, a printing control process in the third example, which is executed by the control unit 11 in accordance with the program 12. In the third example, when n+2≤N−1, the control unit 11 corrects the print data to be used for the (n+2)-th pass in the predetermined region A, based on the n-th density, and executes the (n+2)-th pass, based on the print data after the correction. Meanwhile, when n=N−1, the print data to be used for the N-th pass in the predetermined region A is corrected based on the n-th density, and the N-th pass is executed based on the print data after the correction.

Step S100, Step S110, and Step S120 are as described with reference to FIG. 4. In the third example, after Step S110, the control unit 11 executes Step S144, Step S120, and Step S132 in parallel. Step S132 subsequent to Step S120 is as described with reference to FIG. 6.

In Step S144, the printing control unit 12*d* provides the printing head 20 with the print data to be used for the second pass, which is acquired through the pass division in Step S100 from the print data corresponding to the predetermined region A, and executes the second pass. When n=2 as described above, n+2≤N−1 is not satisfied. Thus, in the second pass, there is no need for the colorimetric unit 19 to perform measurement. Step S144 is different from Step S142 in FIG. 6 in that measurement of the colorimetric unit 19 is not performed.

After Step S132 and Step S144 are completed, in Step S174, the printing control unit 12*d* provides the printing head 20 with the print data obtained after the print data to be used for the third pass is corrected in Step S132, and executes the third pass. When n=3 as described above, n=N−1 is satisfied. Thus, along with the third pass, the control unit 11 causes the colorimetric unit 19 to measure density on the medium 30 after ink ejection in the third pass.

Subsequently, in Step S182, the colorimetric result acquisition unit 12*b* acquires, from the colorimetric unit 19, the third density being a colorimetric result in Step S174. In Step S192, based on the third density acquired in Step S182, the print data correction unit 12*c* corrects the print data to be used for the fourth pass, which is acquired through the pass division in Step S100 from the print data corresponding to the predetermined region A. In Step S204, the printing control unit 12*d* provides the printing head 20 with the print data obtained after the print data to be used for the fourth pass is corrected in Step S192, and executes the fourth pass. The fourth pass is the last pass in the predetermined region A, and hence there is no need for the colorimetric unit 19 to perform measurement. With this, printing in one predetermined region A with the N passes is completed.

The third example as described above has both the features in the first example and the second example. In other words, the print data to be used for the (n+2)-th pass is corrected based on the n-th density that satisfies n+2≤N−1. Thus, in parallel to the (n+1)-th pass, a series of processing for correcting the print data to be used for the (n+2)-th pass can be executed, which exerts an effect of time reduction. The print data to be used for the N-th pass is corrected based on the n-th density that satisfies n=N−1. Thus, the print data for the N-th pass is subjected to correction based on a colorimetric result of the pass executed based on the corrected print data. With this effect exerted by repeating correction, an ideal color is easily obtained as a printing result in the predetermined region A, as compared to the second example.

Supplemental description is made on the first example to the third example. Description is given above assuming that N=4, but as a matter of course, N is not limited to four. For example, N may be N=6.

In the first example, even when N=6, the above-mentioned cycle is repeated.

In the second example, when N=6, Step S172 contains measurement of density on the medium 30 after ink ejection in the third pass. In parallel to Step S202, print data to be used for a fifth pass is corrected based on the third density acquired through the measurement. Similarly, Step S202 contains measurement of density on the medium 30 after ink ejection in the fourth pass. In parallel to the fifth pass, print data to be used for a sixth pass is corrected based on a fourth density acquired through the measurement. After Step S202, the fifth pass is executed based on the corrected print data to be used for the fifth pass. Further, the sixth pass is executed based on the corrected print data to be used for the sixth pass. Then, printing in the predetermined region A is completed.

In the third example, when N=6, n+2≤N−1 is satisfied where n=1 to 3. Thus, the third example is similar to the second example in that the print data to be used for the fifth pass is corrected based on the third density and that the fifth pass is executed based on the corrected print data to be used for the fifth pass. However, when n=4, n+2≤N−1 is not satisfied. Thus, unlike the second example, the print data to be used for the sixth pass is not corrected based on the fourth density in the third example. Alternatively, when n=5, n=N−1 is satisfied. Thus, density on the medium 30 after ink ejection in the fifth pass is measured to acquire fifth density, and the print data to be used for the sixth pass is corrected based on the fifth density. Further, the sixth pass is executed based on the corrected print data to be used for the sixth pass. Thus, printing in the predetermined region A is completed.

4. Description on Printing Performed on Plurality of Sheets

Next, description is made on a process when printing is successively performed on a plurality of media 30 in the present exemplary embodiment. Note that, even when printing is performed based on the print data that is similarly corrected, a color in a printing result differs as a matter of course, depending on a type of the medium 30. Thus, printing on the plurality of media 30 described below is a process assuming that the transport unit 17 repeatedly transports the media 30 of the same type set on a tray or the like being a supply source of the media 30 and that the plurality of media 30 of the same type are used for printing.

Figure 8:
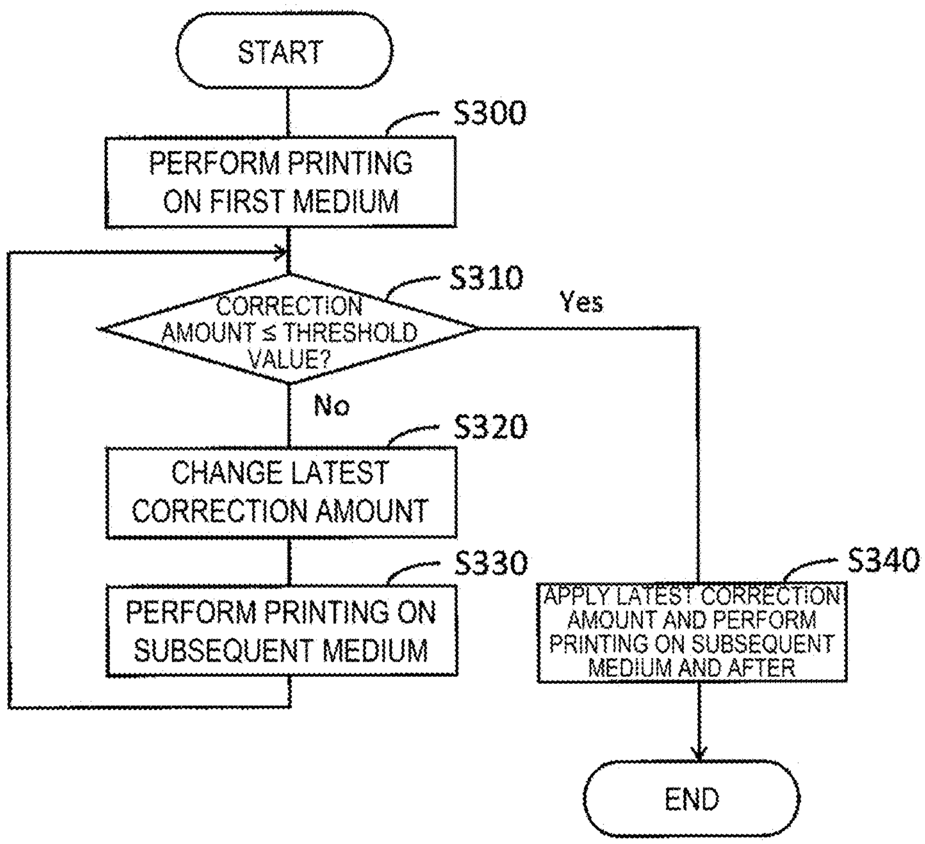
FIG. 8 is a flowchart illustrating a printing control process when printing is successively performed on a plurality of media.

FIG. 8 illustrates, using a flowchart, a printing control process executed by the control unit 11 in accordance with the program 12 when printing is successively performed on the plurality of media 30.

In Step S300, the control unit 11 controls the transport unit 17 and the printing unit 18 to perform printing on a first medium 30 based on the print data. As described above, printing on one medium 30 based on the print data is completed by repeating printing in the plurality of predetermined regions A that are successive along the transport direction D2 in one medium 30. As a matter of course, printing in one predetermined region A is a process completed with the N passes described above, and corresponds to any one of the first example, the second example, and the third example.

In Step S310 subsequent to Step S300, the control unit 11 determines whether correction amount applied to print data for any pass is equal to or less than a predetermined threshold value during printing on the first medium 30 in Step S300. The threshold value is stored in advance in the storage unit 15, for example. The correction amount may be a negative correction amount or a positive correction amount, but the correction amount to be compared with the threshold value is an absolute value.

Herein, as a simple example, it is assumed that printing on one medium 30 including ten predetermined regions A continuous along the transport direction D2 is completed by executing the N passes for each of the predetermined regions A as in the first example. Further, it is assumed that N=4. In this case, in Step S300, the printing unit 18 executes 40 passes. In the first example, each of the second pass to the fourth pass excluding the first pass among the four passes in one predetermined region A is executed by using the print data corrected based on the measured density. Thus, in Step S300, the process for determining the correction amount based on the measured density is executed 30 times for each ink color, and the print data is corrected for the 30 passes for each ink color. Therefore, when all the correction amounts (30×the number of ink colors in total) are equal to or less than the threshold value, the control unit 11 determines "Yes" in Step S310. In contrast, when any one or more of the correction amounts exceed the threshold value, the control unit 11 determines "No" in Step S310. The control unit 11 proceeds from "Yes" in Step S310 to Step S340, and proceeds from "No" in Step S310 to Step S320.

In Step S340, the control unit 11 applies the latest correction amount to the print data, repeatedly executes printing on a subsequent medium and after by the necessary number of media, and then terminates the flowchart. In Step S340, the print data is corrected based on the correction amount. However, the colorimetric unit 19 does not measure an ink ejection result in a pass, or the correction amount is not determined based on the measured density. The expression "a subsequent medium and after" in Step S340 means a subsequent medium and after of the first medium subjected to printing in Step S300 or a subsequent medium and after of the number of media subjected to printing in Step S330 described later. When determination of "Yes" is made in Step S310 directly after Step S300 and the process proceeds to Step S340, this means that printing on the first medium is completed. Thus, in Step S340, printing is performed on the second medium and after, in other words, the second medium, the third medium, the fourth medium, . . . . Meanwhile, in a case that Step S330 is executed once or more, that determination of "Yes" is made in Step S310, and that the process proceeds to Step S340, this means that, at this state, printing on the second medium is at least completed.

"The latest correction amount" means the correction amount applied to printing on the last medium 30 for which printing is completed most recently. Due to the latest correction amount, what correction amount is to be applied to print data for each pass in each predetermined region A is all determined. Thus, in Step S340, same printing is only required to perform as printing on the latest medium, including correction of the print data for each pass. When determination of "Yes" is made in Step S310 directly after Step S300, and the process proceeds to Step S340, the correction amount applied to printing on the first medium 30 in Step S300 corresponds to "the latest correction amount". Meanwhile, when determination of "Yes" is made in Step S310 after Step S330, and the process proceeds to Step S340, the correction amount applied to printing on the medium 30 in Step S330 corresponds to "the latest correction amount".

Thus, when all the correction amounts applied to the print data in the passes are equal to or less than the predetermined threshold value during printing on the first medium 30 in Step S300, the control unit 11 applies each correction, which is applied to each piece of the print data for each pass during printing on the first medium 30, to the print data for each of the passes during printing on the second medium 30 and after, in Step S340 after "Yes" in Step S310. Note that the contents of the print data before correction are the same between the first medium, and the second medium and after.

In Step S320, the control unit 11 changes "the latest correction amount". Here, the correction amount that is the latest correction amount and is determined to exceed the threshold value in Step S310 is partially distributed to print data for another pass. This is because, when the correction amount to be applied to the print data to be used for a pass of the N passes is prominently large, a number of large dots are used in the pass to degrade graininess, which may be conceived to affect image quality, and a difference between the correction amounts of the print data for the passes is preferably reduced.

Various methods of distributing the correction amount are conceivable. Basically, the correction amount is distributed to a pass having a relatively smaller correction amount. As described above, the correction amount is a value determined based on the colorimetric result obtained by the colorimetric unit 19. Thus, a distribution destination of the correction amount in Step S320 is basically a correction amount that is not determined based on a colorimetric result, that is, a correction amount for the print data to be used for the first pass of the N passes. When the second example or the third example is adopted, the correction amount for the print data to be used for the second pass of the N passes may be a distribution destination.

For example, during printing on the first medium 30 in Step S300, it is assumed that, in a predetermined region A, the correction amount applied to the print data for the second pass is +γ, the correction amount applied to the print data for the third pass is +γ/4, and the correction amount applied to the print data for the fourth pass is +γ/8. In Step S300, in the predetermined region A, the correction amount applied to the print data for the first pass is 0. Further, when the correction amount +γ applied to the print data for the second pass exceeds the predetermined threshold value, the control unit 11, in Step S320 after "No" in Step S310, determines a difference +γ' between the correction amount +γ and the threshold value as a correction value to be applied to the print data for the first pass in the same predetermined region A. In other words, the correction amount to be applied to the print data to be used for the first pass in a predetermined region A is changed from 0 to +γ'.

In Step S330, the control unit 11 corrects the print data for the pass corresponding to the correction amount, with the correction amount changed in Step S320, and performs printing on a subsequent medium. For example, in Step S330 after "No" in Step S310 directly after Step S300 and Step S320, the control unit 11 performs printing on the second medium 30. Similarly to Step S300, printing in Step S330 is printing with measurement of the ink ejection result in the pass, determination of the correction amount based on the measured density, and correction of the print data for the pass with the determined correction amount. In the example described above, the print data to be used for the first pass in a predetermined region A is corrected by applying the correction amount +γ' thereto, and the first pass is executed based on the print data after the correction. In each of the passes thereafter in the same predetermined region A, the ink is ejected based on the print data corrected with the correction amount obtained based on the colorimetric result of the colorimetric unit 19. However, the correction amount for the first pass is set to +γ', and hence the correction amount for the second pass is less likely to be a correction amount exceeding the threshold value.

In Step S310 after Step S330, the control unit 11 is only required to determine whether every correction amount (the latest correction amount) applied to each piece of the print data for each pass during printing on one medium 30 in Step S330 is equal to or less than the predetermined threshold value, and to branch the process. In FIG. 8, after repeating the cycle of "No" in Step S310, Step S320, and Step S330 a plurality of times, the process may proceed from "Yes" in Step S310 to Step S340. As described above, when the correction amount applied to the print data for any one of the passes exceeds the threshold value during printing on the first medium 30 in Step S300, the control unit 11 determines, as each correction to be applied to each piece of the print data for each pass, each correction with the correction amount equal to or less than the threshold value, and applies each determined correction to each piece of the print data for each pass during printing on the second and subsequent media 30 after "No" in Step S310.

As described above, printing in Step S300 and printing in Step S330 involves the processes such as measurement and determination of the correction amount based on the colorimetric result. Thus, a certain amount of time is additionally required. In contrast, printing in Step S340 does not require the processes such as measurement and determination of the correction amount. Thus, printing can be performed quickly on most of the media, except for the first medium or the first two or three media of the plurality of media 30. In other words, a total time required to perform printing on the plurality of media 30 of the same type is not particularly increased. Even when the medium 30 with unknown color development characteristics such as the way of ink bleed-through is used, a printed matter on which an ideal color is reproduced can be obtained without wasting the first medium and after.

5. Conclusion

As described above, in the present exemplary embodiment, the printing apparatus 10 includes the printing head 20 that ejects the ink onto the medium 30 based on the print data, the carriage 21 that is mounted with the printing head 20 and that reciprocates along the main scanning direction D1, the control unit 11 that controls the carriage 21 and the printing head 20 and executes a pass corresponding to ink ejection of the printing head 20 along with movement of the carriage 21, and the colorimetric unit 19 that measures the density on the medium 30 when the pass is completed. When printing is performed in the predetermined region A of the medium 30 with the N passes, and n is a natural number smaller than N, the control unit 11 acquires the n-th density being a colorimetric result obtained by the colorimetric unit 19 with respect to the medium 30 when the n-th pass in the predetermined region A is completed, corrects the print data to be used for the pass after the n-th pass in the predetermined region A, based on the n-th density, and executes the pass after the n-th pass based on the print data after the correction.

With the configuration described above, in the process until the N passes in the predetermined region A is completed, the print data to be used for the pass after the n-th pass is corrected based on the n-th density, and the pass after the n-th pass is executed based on the print data after the correction. Thus, at the time of completion of the N passes, the printing result that is the same or substantially the same as the ideal density can be obtained. Therefore, even when the medium 30 with unknown color development characteristics is used for the first time, a printing result with high quality can be obtained without wasting the medium 30 or time due to test printing.

In the present exemplary embodiment, the print data is data that defines presence or absence of a dot of ink and a size of the dot for each pixel. The control unit 11 changes a defined size of the dot at the time of correction of the print data to be used for the pass after the n-th pass.

With the configuration described above, with regard to a dot that is a correction target and is defined originally in the print data, the size of the dot is changed to a large size or a small size. With this, while suppressing change of image quality such as graininess, which is originally reproduced by the print data, as much as possible, the ink amount to be ejected onto the medium 30 can be corrected.

Note that, correction of the print data may include a process of providing a new dot to a pixel that is not defined as dot-on in the print data before correction and a process of deleting a dot from a pixel that is defined as a dot-on in the print data before correction.

In the present exemplary embodiment, various examples are given as specific examples of "correcting the print data to be used for the pass after the n-th pass in the predetermined region A, based on the n-th density".

In other words, as in the first example, the control unit 11 may correct the print data to be used for the (n+1)-th pass in the predetermined region A, based on the n-th density, and may execute the (n+1)-th pass based on the print data after the correction.

As in the second example, the control unit 11 may correct the print data to be used for the (n+2)-th pass in the predetermined region A, based on the n-th density, and may execute the (n+2)-th pass based on the print data after the correction.

As in the third example, when $n+2 \leq N-1$, the control unit 11 may correct the print data to be used for the (n+2)-th pass in the predetermined region A, based on the n-th density, and may execute the (n+2)-th pass based on the print data after the correction. When $n=N-1$, the control unit 11 may correct the print data to be used for the N-th pass in the predetermined region A, based on the n-th density, and may execute the N-th pass based on the print data after the correction.

The respective effects in the first example to the third example are as described above.

In the present exemplary embodiment, the printing apparatus 10 may be provided with the colorimetric unit 19 at each of both the ends of the printing head 20 in the main scanning direction D1.

With the configuration described above, the result of the ink ejection can be measured along with the ink ejection of the printing head 20 in the forward pass, and the result of the ink ejection can be measured along with the ink ejection in the backward pass. In other words, a time required only for the measurement is not substantially generated.

In the present exemplary embodiment, when, during printing on the first medium 30, all the correction amounts applied to the print data in the passes are equal to or less than the predetermined threshold value, the control unit 11 applies each correction, which is applied to each piece of the print data for each pass during printing on the first medium 30, to the print data for each of the passes during printing on the second medium 30 and after, which are the same type of the first medium 30. Meanwhile, when the correction amount applied to the print data for any one of the passes exceeds the threshold value during printing on the first medium 30, the control unit 11 determines, as each correction to be applied to each piece of the print data for each pass, each correction with the correction amount equal to less than the threshold value, and applies each determined correction to each piece of the print data for each pass during printing on the second medium 30 and after, which are the same type of the first medium 30.

With the configuration described above, when printing on the plurality of media 30 of the same type is evaluated as a whole, a printing result with high quality can be obtained for each medium without wasting the medium 30 while suppressing increase of a printing time.

In the present exemplary embodiment, the disclosures relating to various categories such as a method executed by the apparatus and the system and the program 12 for causing a processor to execute the method are given in addition to the apparatus and the system.

For example, the printing method is for controlling the printing head 20 that ejects the ink onto the medium 30 based on the print data and the carriage 21 that is mounted with the printing head 20 and that reciprocates along the main scanning direction D1, and for executing a pass corresponding to ink ejection of the printing head 20 along with movement of the carriage 21. The printing method includes, when printing is performed in the predetermined region A of the medium 30 with the N passes, and n is a natural number smaller than N, acquiring the n-th density, which is a density colorimetric result of the medium 30 obtained by the colorimetric unit 19 when the n-th pass in the predetermined region A is completed, correcting the print data to be used for the pass after the n-th pass in the predetermined region A based on the n-th density, and executing the pass after the n-th pass based on the print data after the correction.

In addition, some aspects included in the present exemplary embodiment are described.

The colorimetric unit 19 is not limited to a configuration in the example of FIG. 2 in which the colorimeters 19*a* and 19*b* are mounted on the carriage 21 together with the printing head 20. When the printing unit 18 is a type that performs mono-directional printing, the colorimetric unit 19 may be only either of the colorimeters 19*a* or 19*b*. The colorimetric unit 19 is only required to have a configuration that enables, before a subsequent pass starts, measurement in a region of the medium 30 onto which the ink is ejected in the pass. Therefore, the colorimetric unit 19 may be fixed to a part or a position other than the carriage 21, or a configuration in which the colorimetric unit 19 itself moves for measurement may be adopted. The colorimetric unit 19 may be a device provided separately from the printing apparatus 10.

As described with reference to FIG. 2, the region length H of the predetermined region A is set as 1/N of the length of the nozzle row along the transport direction D2, and the medium 30 is transported by the region length H between a pass and a subsequent pass. In this configuration, as a matter of course, one pass of the printing head 20 is also a pass in each of different predetermined regions A. For example, when N=4, the fourth pass in the most downstream predetermined region A among the four predetermined region A that are aligned along the transport direction D2 is also the third pass, the second pass, and the first pass in the three upstream predetermined regions A continuous to the most downstream predetermined region A. Therefore, as a matter of course, a value obtained by multiplying N by the number of predetermined regions A in one medium 30 does not match with the number of passes required for performing printing on one medium 30 in some cases.

What is claimed is:

1. A printing apparatus comprising:

a printing head configured to eject ink onto a medium based on print data;

a carriage that is mounted with the printing head and that is configured to reciprocate along a main scanning direction;

a control unit configured to control the carriage and the printing head and execute a pass corresponding to ink ejection of the printing head along with movement of the carriage; and a colorimetric unit configured to measure density on the medium when the pass is completed, wherein when the control unit performs printing in a predetermined region of the medium with the pass executed N times, and n is a natural number smaller than N, the control unit acquires a n-th density of the medium, the n-th density being a colorimetric result obtained by the colorimetric unit when an n-th pass in the predetermined region is completed, corrects the print data based on the n-th density, the print data being to be used for a pass after the n-th pass in the predetermined region, and executes the pass after the n-th pass based on the print data after correction, wherein when an amount of the correction applied to the print data for any pass is equal to or less than a predetermined threshold value during printing on a first medium, the control unit applies, to each piece of the print data for each pass during printing on second and subsequent media being a same type as the first medium, each correction applied to each piece of the print data for each pass during printing on the first medium, and when an amount of the correction applied to the print data for any pass exceeds the predetermined threshold value during printing on the first medium, the control unit determines each correction so that an amount of the correction is equal to or less than the threshold value, each correction being to be applied to each piece of the print data for each pass during printing on the second and subsequent media being the same type as the first medium, and applies each determined correction to each piece of the print data for each pass.

2. The printing apparatus according to claim 1, wherein the print data is data that defines presence or absence of a dot of ink and a size of the dot for each pixel and the control unit changes a defined size of the dot at the time of correction of the print data to be used for the pass after the n-th pass.

3. The printing apparatus according to claim 1, wherein the control unit corrects the print data to be used for an (n+1)-th pass in the predetermined region, based on the n-th density, and executes the (n+1)-th pass based on the print data after correction.

4. The printing apparatus according to claim 1, wherein the control unit corrects the print data to be used for an (n+2)-th pass in the predetermined region, based on the n-th density, and executes the (n+2)-th pass based on the print data after correction.

5. The printing apparatus according to claim 1, wherein when $n+2 \leq N-1$, the control unit corrects the print data to be used for an (n+2)-th pass in the predetermined region, based on the n-th density, and executes the (n+2)-th pass based on the print data after correction and when $n=N-1$, the control unit corrects the print data to be used for an N-th pass in the predetermined region, based on the n-th density, and executes the N-th pass based on the print data after correction.

6. The printing apparatus according to claim 1, wherein the colorimetric unit is provided at each of both ends of the printing head in the main scanning direction.

7. A printing method for controlling a printing head configured to eject ink onto a medium based on print data and a carriage that is mounted with the printing head and that is configured to reciprocate along a main scanning direction, and for executing a pass corresponding to ink ejection of the printing head along with movement of the carriage, the printing method comprising:

when printing is performed in a predetermined region of the medium with the pass executed N times, and n is a natural number smaller than N, acquiring n-th density of the medium, the n-th density being a density colorimetric result obtained by a colorimetric unit when an n-th pass in the predetermined region is completed;

correcting the print data based on the n-th density, the print data being to be used for a pass after the n-th pass in the predetermined region; and executing the pass after the n-th pass based on the print data after correction, wherein when an amount of the correction applied to the print data for any pass is equal to or less than a predetermined threshold value during printing on a first medium, the control unit applies, to each piece of the print data for each pass during printing on second and subsequent media being a same type as the first medium, each correction applied to each piece of the print data for each pass during printing on the first medium, and when an amount of the correction applied to the print data for any pass exceeds the predetermined threshold value during printing on the first medium, the control unit determines each correction so that an amount of the correction is equal to or less than the threshold value, each correction being to be applied to each piece of the print data for each pass during printing on the second and subsequent media being the same type as the first medium, and applies each determined correction to each piece of the print data for each pass.

* * * * *